United States Patent Office
3,328,492
Patented June 27, 1967

3,328,492
SORBITOL AND MANNITOL ESTERS OF PHOSPHORIC ACID AND SALTS THEREOF
C Roy Gleason, Chicago, Ill., and George H. Slack, Hammond, Ind., assignors to Hexionic Acid Corporation, Chicago, Ill., a corporation of Illinois
No Drawing. Filed Apr. 22, 1963, Ser. No. 274,836
4 Claims. (Cl. 260—924)

The present invention relates to a new composition of matter and to a variety of novel uses to which this composition can be applied.

It is one object of this invention to provide an improved composition of matter capable of being employed for a wide variety of applications.

It is a further object of this invention to provide a new composition of matter which is adapted for use in a highly efficient manner in a variety of applications and which is characterized by a high degree of uniformity and stability.

It is an additional object of this invention to provide an improved composition of matter which is adapted for use in a method for applying a protective coating on metal surfaces.

It is a further object of this invention to provide an improved composition of matter which can be included in solution in salt form to thereby provide an anti-corrosive agent for treating metal surfaces.

It is a further object of this invention to provide an improved composition of matter which can be utilized as a coolant either alone or in combination with a lubricant to facilitate working operations such as drilling, wherein extreme pressure conditions result.

It is a still further object of this invention to provide an improved composition of matter which is capable of use in electrolytic baths whereby greatly improved metal coating processes can be undertaken.

It is an additional object of this invention to provide an improved composition of matter which can be effectively utilized in the production of resin dispersions and the like.

These and other objects of this invention will appear hereinafter and it will be understood that the specific examples set forth in this specification are provided only for purposes of illustration and not by way of limitation.

The improved composition of matter of this invention generally comprises the product obtained from the reaction of phosphoric acid, a polyhydric alcohol and water. The composition is achieved through the use of a polyhydric alcohol selected from the group consisting of sorbitol and mannitol. The reaction which takes place upon mixing of these ingredients involves stoichiometric amounts of the substances involved although it will be understood that the actual preparation of the novel compositions may include procedures involving excess amounts of the various ingredients.

The composition of matter which characterizes the instant invention can be simply and efficiently prepared by mixing of the noted ingredients and by heating the mixture to temperatures in the order of about 250° F. It has been found that the reaction taking place is, as a practical matter, continued until the mixture has achieved an amber color where sorbitol is used and a lighter amber color where mannitol is used. In practice, the heating operation is carried out for from about 10 to about 30 minutes.

As previously noted, the composition of this invention is particularly adaptable for use in a variety of different applications. Thus, the composition has been effectively provided in aqueous solutions containing from about 1 to 30 percent by weight of the composition. Metal objects immersed in this aqueous solution are provided with a protective coating which is effective to resist corrosion and other environmental conditions which tend to damage the metal properties.

The compositions of this invention can effectively be employed in the preparation of anti-corrosive agents for use in the treating of metal surfaces. Agents of this type have been prepared by forming sodium, potassium, lithium and ammonium salts of the novel composition and then by providing a solution containing these salts, which solution can be applied to the metal surfaces. It has been found that the combination of these salts with colloidal silica provides a particularly suitable anti-corrosive agent.

The composition of this invention has also been effectively utilized in electrolytic baths used for forming a metal coating on a base metal. Thus, the novel composition, when added in an amount from 2 to 50 grams per liter of an electrolyte containing cations of the coating metal, provides for significant increases in the efficiency of the metal coating operation.

It has also been found that the composition of this invention may be utilized in methods for preparing resin dispersions. Specifically, the composition of this invention can be combined with a resin formed of phthalic anhydride and propylene glycol or triethylene glycol, also including pelargonic acid, water, and ammonium hydroxide. It has been found that heating of this combination to a temperature of at least about 400° F. will provide a resin dispersion capable of use as a plasticizing agent and for applications requiring a dispersion capable of wetting paper and the like whereby such products can be impregnated with the dispersion to provide improved characteristics. In instances where it is not necessary to provide for wetting by the dispersion, the pelargonic acid can be eliminated.

The following will provide examples of the concepts intended to be covered by this disclosure:

Example I

In the preparation of the composition characterizing the instant invention, 255 parts by weight of an 85 percent solution of phosphoric acid was combined with 70 parts by weight of sorbitol and 30 parts by weight water. The mixture was heated to a temperature of 250° F. and the heating was continued until the completion of the reaction was indicated by the amber color of the solution. The resulting composition proved to be a uniform, stable solution.

Example II

The ingredients employed in Example I and the amounts thereof were duplicated in Example II with the exception that mannitol was substituted for sorbitol. The mixture was heated at about 250° F. until the reaction was completed, in this case for about 10 minutes. Again, a uniform, stable batch of the composition of this invention was provided.

Example III

The product obtained in Example I was added to water to provide a 10 percent solution. A steel block having a previously cleaned surface and immersed in the solution and a coating resulted on this surface. Exposure of the steel block to corrosive conditions indicated that the coating effectively prevented the formation of rust or the occurrence of other deleterious surface conditions.

Example IV 12 parts by weight of the composition prepared in accordance with Example I was reacted with 20 parts by weight NaOH and the salt provided was combined with water to form a 10 percent aqueous solution. Coating of this solution on a steel surface also provided a film capable of resisting the effects of corrosive atmospheres.

This same salt solution was also used as a coolant for a metal drilling operation. The tool was not heated to any appreciable extent during drilling and marked improvements in tool life was recognized.

*Example V*

A salt of the composition of this invention was also prepared by reacting the composition with $NH_3OH$. A 10 percent aqueous solution containing this salt was applied to a zinc surface and the coating resulting therefrom resisted any tendency of corrosion of this surface.

*Example VI*

A solution was prepared by combining 40 parts by weight of a 10 percent oleic acid colloidal silica solution with 350 parts by weight hot water and 20 parts by weight sodium hydroxide. 5 parts by weight silica antifoam agent was employed as an alternative addition. The combination was mixed for 10 minutes and about 12 parts by weight of the composition of Example II was then added to the mix to neutralize the mix whereby a pH of about 8 was achieved. Upon adding about 450 parts by weight of water, a protective coating solution for steel surfaces was realized.

*Example VII*

An aqueous electrolyte was prepared by introducing into water 80 grams per liter of nickel chloride hexahydrate along with 30 grams per liter of an 80 percent by weight aqueous solution of the composition obtained in Example II. This electrolyte was utilized in a standard plating operation wherein nickel was applied to a copper surface. A tightly adherent nickel coating was formed on the copper surface and a distinct nickel appearance was realized.

*Example VIII*

A resin prepared by combining 85 parts by weight phthallic anhydride and 60 parts by weight propylene glycol was utilized in the preparation of a resin dispersion. 200 parts by weight of this resin were combined with 10 parts by weight of the composition of Example II, 16 parts by weight pelargonic acid, 120 parts by weight water and 80 parts by weight ammonium hydroxide. The mixture was heated for about 20 minutes at a temperature of about 425° F. The reaction taking place was characterized by frothing and was exothermic whereby control of the applied heat was required to maintain the approximate temperature level. The resulting resin dispersion formed a highly satisfactory non-migrating resin plasticizer.

*Example IX*

The ingredients referred to in Example VIII were employed in a further test with the exception of pelargonic acid. The reaction product produced was a resin dispersion which did not wet paper as opposed to the wetting characteristics of the dispersion of Example VII.

It will be appreciated that there has been described a unique composition of matter adapted to be advantageously employed for a variety of compositions. The composition of matter may be defined as a phosphoric acid ester characterized by a phosphoric acid base. The composition of this invention has been found to be of an extremely economical nature both with regard to the expense of the ingredients involved and with regard to its ease of manufacture. The simplified method described can be most efficiently undertaken by combining the preparation of the composition with the production of phosphoric acid. Thus when the newly prepared acid has cooled to about 250° F. it can be employed for producing the compositions of this invention, and the ingredients employed are readily available.

The subject matter of this invention further presents extremely valuable characteristics in that the reaction product is characterized by high uniformity and stability. Compositions produced in accordance with this invention can be allowed to stand for indefinite periods without a significant loss of uniformity, and this feature presents clear advantages with respect to less stable prior art compositions.

Some evaluation of the characteristics of the reaction product of this invention has been undertaken; however, it will be understood that the appended claims are not necessarily limited in accordance with the characteristics which have been observed. In at least one instance, an evaluation has revealed that the reaction product is 79 to 80 percent acid and contains about 23 percent by weight phosphorus. The evaluation further indicated that the product exhibits no evidence of a tendency to produce or support bacterial growth. Accordingly, applications of the composition of this invention can be extended to areas wherein the presence of bacteria must be controlled.

It will be appreciated that the composition of this invention can be applied to a wide variety of other applications not specified herein. It will also be understood that various changes and modifications can be made with respect to the composition, the method of its manufacture and the uses referred to herein, which changes do not depart from the spirit of the invention as defined in the following claims.

That which is claimed is:

1. A phosphoric acid ester consisting of the reaction product obtained by mixing approximately stoichiometric amounts of phosphoric acid, a polyhydric alcohol selected from the group consisting of sorbitol and mannitol, and water, and heating the mixture to about 250° F.

2. A composition of matter in accordance with claim 1 wherein said heating is carried out for from about 10 to about 30 minutes.

3. A salt selected from the group consisting of the sodium, potassium, lithium, and ammonium salts of the product of claim 1.

4. A method for the production of a uniform, stable phosphoric acid ester comprising the steps of mixing approximately stoichiometric amounts of phosphoric acid, a polyhydric alcohol selected from the group consisting of sorbitol and mannitol, and water and heating the mixture to about 250° F.

References Cited

UNITED STATES PATENTS

| | | | |
|---|---|---|---|
| 2,265,585 | 12/1941 | Urbain et al. | 260—978 X |
| 2,389,135 | 11/1945 | Brown | 204—45 |
| 2,389,181 | 11/1945 | Brown | 204—45 |
| 2,612,513 | 9/1952 | Gluesenkamp et al. | 260—461 |
| 2,631,162 | 3/1953 | Ladd et al. | 260—461 |
| 3,036,934 | 5/1962 | Horton et al. | 117—132 |
| 3,044,899 | 7/1962 | Canterino | 117—132 |
| 3,177,144 | 4/1965 | Reamer et al. | 252—32.5 |
| 3,203,896 | 8/1965 | Latos et al. | 252—32.5 |

FOREIGN PATENTS 484,356  10/1929  Germany.

OTHER REFERENCES

Kosolapoff: "Organo-Phosphorus Compounds," John Wiley and Sons, New York, (1950), page 222.

CHARLES B. PARKER, *Primary Examiner.*

HOWARD S. WILLIAMS, *Examiner.*

ANTON H. SUTTO, G. KAPLAN, FRANK M. SIKORA, *Assistant Examiners.*